Nov. 17, 1925.  
C. M. REED  
SELF AND EVER SET TRAP  
Filed July 23, 1925  
1,562,365  
2 Sheets-Sheet 1
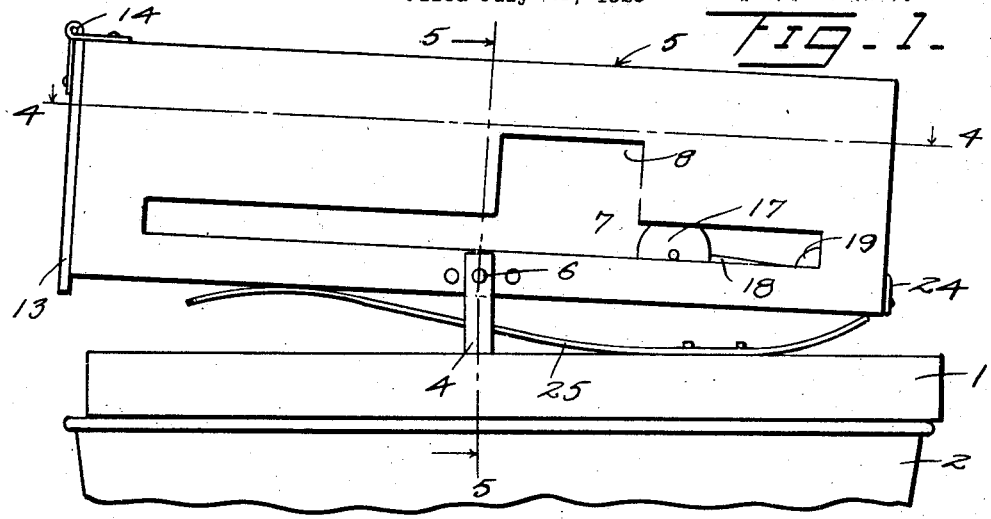
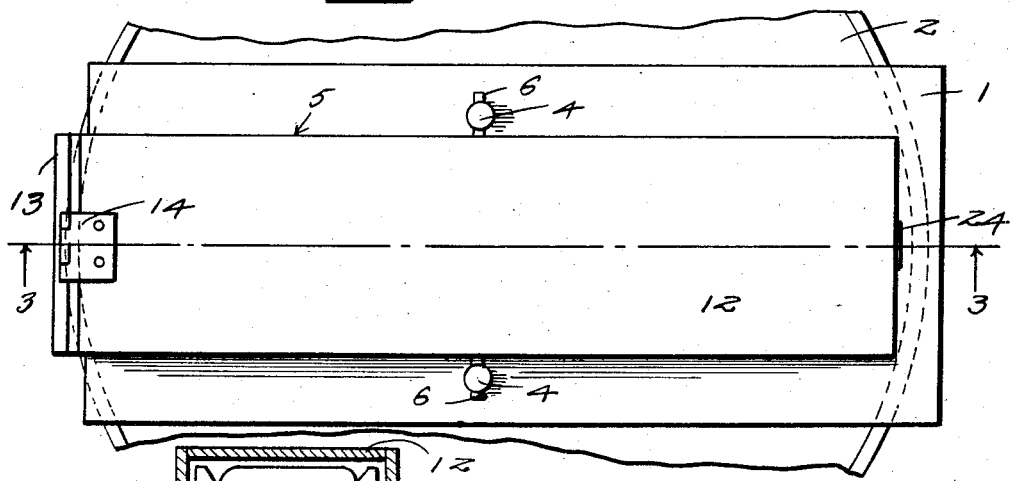
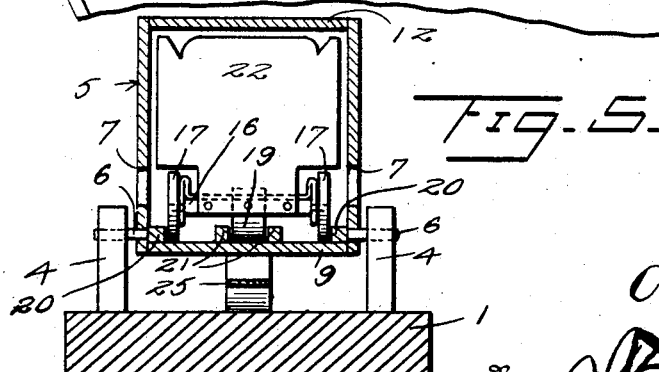
Inventor  
C. M. Reed Nov. 17, 1925.

C. M. REED

SELF AND EVER SET TRAP

Filed July 23, 1925

Inventor
C. M. Reed

Patented Nov. 17, 1925.

1,562,365

UNITED STATES PATENT OFFICE.

CHARLES M. REED, OF KABLETOWN, WEST VIRGINIA.

SELF AND EVER SET TRAP.

Application filed July 23, 1925. Serial No. 45,625.

*To all whom it may concern:*

Be it known that I, CHARLES M. REED, a citizen of the United States, residing at Kabletown, in the county of Jefferson and State of West Virginia, have invented certain new and useful Improvements in Self and Ever Set Traps; and I do hereby declare the following to be a full, clear, and exact description of the invention, such as will enable others skilled in the art to which it appertains to make and use the same.

This invention relates to mouse and rat traps of self and ever-set type.

The invention has for one of its objects the provision of a trap of the character stated which shall include a body adapted to be supported over a receptacle containing water, and means adapted to insure the prompt passing of the rodent from the body into the receptacle.

A further object of the invention is the provision of a trap of the character stated wherein the body shall be yieldingly supported in an outwardly and forwardly inclined position and adapted to be moved into a downwardly and forwardly inclined position by a rodent and wherein the means for insuring the passage of the rodent from the body into the receptacle shall be movably mounted within the body and set in motion by and on the downward and forward movement of the body to effect the impelling of the rodent into the receptacle.

With the foregoing and other objects in view, the invention consists of the construction, combination and arrangement of parts hereinafter fully described and claimed, and illustrated in the accompanying drawings, wherein:

Figure 1 is a view in side elevation of the trap;

Figure 2 is a top plan view of the trap;

Figure 5 is a sectional view on the planes indicated by the line 5—5 of Figure 1.

Corresponding and like parts are referred to in the following description, and designated in the several views of the accompanying drawings, by similar reference numerals.

Figure 3:
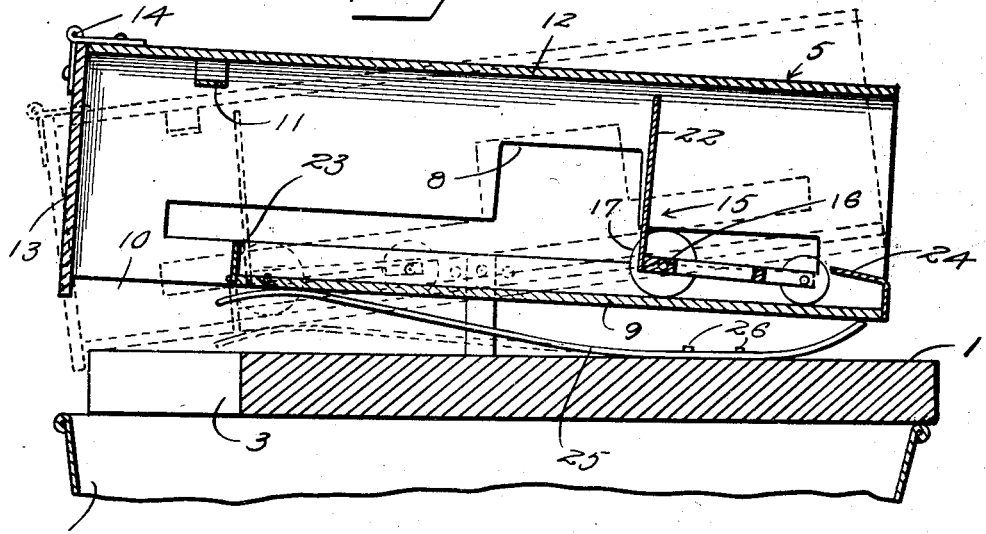
Figure 3 is a sectional view taken on the vertical plane indicated by the line 3—3 of Figure 2.
Figure 4:
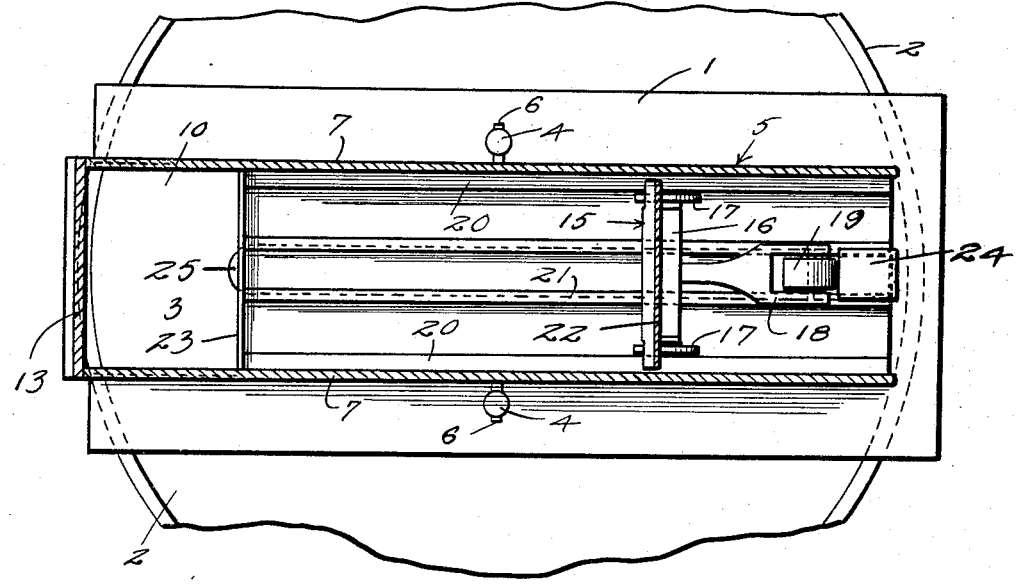
Figure 4 is a sectional view taken on the horizontal plane indicated by the line 4—4 of Figure 1.

The trap comprises an elongated base 1 which is adapted to be positioned upon the upper edge of a receptacle 2 containing water and which is provided at its front end with an opening 3. A pair of relatively spaced and transversely alined bearing standards 4 extend upwardly from the base 1. A body 5 of hollow and elongated formation and extending transversely of the base 1, is pivoted to and between the standards 4 by pins 6 or the like. The pins 6 engage the body 5 at points slightly to the rear of its transverse center so that it will normally occupy an upwardly and forwardly inclined position. The body 5 is provided in its sides 7 with entrance openings 8 and in its bottom 9 with an exit or discharge opening 10. The entrance openings 8 are located rearwardly of the pivots 6, and the discharge opening 10 is located in the front end of the bottom 9 and registers with the opening 3 in the base 1. A bait support 11 is secured to the inner side of the top 12 of the body 5 at a point directly above the discharge opening 10. The front 13 of the body 5 is hinged as at 14 to permit of easy access to the bait support 11. A rodent entering the body 5 will on passing forwardly to the bait carried by the support 11, cause the body to tilt downwardly and forwardly, and to insure the passage of the rodent from the body to the receptacle 2 an impeller 15 is provided. A rodent entering the body 5 will move forwardly to the bait carried by the holder 11, and the body will under the influence of the weight of the rodent move downwardly and forwardly and set in motion an impeller 15 which will insure the prompt passage of the rodent through the openings 10 and 3 into the receptacle 2. The impeller 15 comprises a substantially T-shaped frame, the transverse member 16 of which is provided with wheels 17 and the longitudinal member 18 of which is provided with a wheel 19. The wheels 17 travel on the bottom 9 between guides 20, and the wheel 19 travels on said part between guides 21. An impact plate 22 is secured to and extends upwardly from the impeller frame member 16 and is adapted to contact with and force the rodent through the openings 10 and 3 into the receptacle 2. When the body 5 is in normal position the impeller 15 is located immediately in rear of the entrance openings 8. The forward movement of the impeller 15 is limited by a stop 23 and its rearward movement by a stop 24 both of which are carried by the bottom 9. After the rodent has been ejected therefrom, the body 5 returns to its normal or upwardly and forwardly inclined position, and the return of the body to such position causes the impeller 15 to return to its normal position at the rear of the entrance openings 8.

A leaf spring 25 secured as at 26 to the upper side of the base 1 contacts with the bottom 9 and supports the body 5 in normal position against casual movement. The spring 25 also insures the prompt return of the body 5 to its normal position after a rodent has been discharged therefrom.

From the foregoing description, taken in connection with the accompanying drawings, the advantages of the construction and of the method of operation of the trap will be readily apparent to those skilled in the art to which it appertains. While I have described the principle of operation of the trap, together with the structure which I now consider to be the best embodiment thereof, I desire to have it understood that the structure shown is merely illustrative, and that such changes may be made therein when desired as are within the scope of the invention as claimed.

What is claimed is:

1. A trap comprising a pivoted body provided with an entrance and an exit and adapted to be tilted downwardly and forwardly by a rodent, and an impeller adapted to be set in motion by tilting of the body to eject the rodent.

2. A trap comprising a pivoted body provided with an entrance and an exit and adapted to be tilted downwardly and forwardly by a rodent, and a wheel-supported impeller adapted to be set in motion by the tilting of the body to eject the rodent.

3. A trap comprising a base, a body provided with an entrance and an exit, means pivotally supporting the body on the base in an upwardly and forwardly inclined position, and an impeller movably mounted within the base.

4. A trap comprising a base, a body provided with an entrance and an exit, means pivotally supporting the body upon the base in an upwardly and forwardly inclined position, a wheeled frame located within the base, and an impact plate carried by said frame.

5. A trap comprising a base, a body provided with an entrance and an exit, means pivotally supporting the body in an upwardly and forwardly inclined position on the base, and an impeller within the body normally occupying a position rearwardly of the entrance.

6. A trap comprising a base, a body provided with an entrance and an exit, means pivotally connecting the body to the base, a spring contacting with the body and yieldingly supporting it in an upwardly and forwardly inclined position, and an impeller movably mounted within the body.

In testimony whereof I affix my signature.

CHARLES M. REED.